(12) United States Patent
Farkas

(10) Patent No.: US 8,737,270 B2
(45) Date of Patent: May 27, 2014

(54) SYSTEM, NETWORK MANAGEMENT SYSTEM, AND METHOD FOR AVOIDING A COUNT-TO-INFINITY PROBLEM

(75) Inventor: János Farkas, Kecskemet (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 198 days.

(21) Appl. No.: 13/508,758

(22) PCT Filed: Aug. 18, 2010

(86) PCT No.: PCT/IB2010/053736
§ 371 (c)(1),
(2), (4) Date: Jun. 6, 2012

(87) PCT Pub. No.: WO2011/058450
PCT Pub. Date: May 19, 2011

(65) Prior Publication Data
US 2013/0051223 A1 Feb. 28, 2013

Related U.S. Application Data

(60) Provisional application No. 61/261,488, filed on Nov. 16, 2009.

(51) Int. Cl.
*H04L 12/46* (2006.01)
*H04L 12/44* (2006.01)
*H04L 12/56* (2006.01)

(52) U.S. Cl.
CPC .............. *H04L 45/28* (2013.01); *H04L 45/72* (2013.01); *H04L 12/462* (2013.01); *H04L 12/4625* (2013.01)
USPC ............................. 370/256; 370/254; 370/216

(58) Field of Classification Search
CPC ...... H04L 41/0654; H04L 45/28; H04L 45/66; H04L 45/02; H04L 12/437; H04B 1/745
See application file for complete search history.

(56) References Cited

PUBLICATIONS

IEEE, "IEEE Standard for Local and Metropolitan Area Networks Virtual Bridged Local Area Networks." IEEE Computer Society sponsored by the LAN/MAN Standards Committee, IEEE Standard, IEEE Std 802.1Q—2005 (Incorporates IEEE Std 802.1Q—1998, IEEE Std 802.1u—2001, IEEE Std 802.1v—2001 and IEEE Std 802.1s—2002), May 19, 2006, New York, New York, pp. 1-303.
Sofia, R. "A Survey of Advanced Ethernet Forwarding Approaches." IEEE Communications Surveys & Tutorials, vol. 11, No. 1, First Quarter 2009, New York, New York, pp. 92-115.
Yeung, K.H. et al. "Improving Network Infrastructure Security by Partitioning Networks Running Spanning Tree Protocol." International Conference on Internet Surveillance and Protection, 2006, ICISP '06, Aug. 26-28, 2006, Cote d'Azur, France.
Tallet, F. "A Layer 2 Gateway Port Mechanism." Cisco Systems slide-show, Garden Grove 802.1 IEEE Interim, Garden Grove, California, Sep. 2005, pp. 1-16.
IEEE, "IEEE Standard for Local and Metropolitan Area Networks—Virtual Bridged Local Area Networks; Amendment 7: Provider Backbone Bridges." IEEE Computer Society sponsored by the LAN/MAN Standards Committee, IEEE Standard, IEEE Std 802.1ah-2008 (Amendment to IEEE Std 802.1Q—2005), Aug. 14, 2008, New York, New York, pp. 1-121.

*Primary Examiner* — Asad Nawaz
*Assistant Examiner* — Zhaohui Yang
(74) *Attorney, Agent, or Firm* — Coats and Bennett PLLC

(57) ABSTRACT

A system (300), a network management system (306), and a method are described herein for avoiding a count-to-infinity problem in a network (304) (e.g., Provider Backbone Bridging) with bridges having network interface ports (2,4) (e.g., Layer Two Gateway Ports) which are connected to an external network (302) (e.g., External Network to Network interface).

9 Claims, 6 Drawing Sheets

SYSTEM, NETWORK MANAGEMENT SYSTEM, AND METHOD FOR AVOIDING A COUNT-TO-INFINITY PROBLEM

TECHNICAL FIELD

The present invention relates to a system, a network management system, and a method for avoiding a count-to-infinity problem in a network (e.g., PBBN) with bridges having network interface ports (e.g., L2GPs) which are connected to an external network (e.g., E-NNI).

BACKGROUND

The following abbreviations are herewith defined, at least some of which are referred to within the following description of the prior art and the present invention.
 BPDU Bridge Protocol Data Unit
 E-NNI External Network to Network Interface
 L2GP Layer Two Gateway Port
 MSTP Multiple Spanning Tree Protocol
 NMS Network Management System
 PBB Provider Backbone Bridging
 PBBN Provider Backbone Bridge Network
 RSTP Rapid Spanning Tree Protocol The count-to-infinity problem is well known in the networking field and may appear after a topology change (e.g., failure event) in a network which is controlled by a distance vector protocol. To briefly explain the count-to-infinity problem, imagine a network connected with network nodes A-B-C-D-E-F where B-C-D-E-F form a ring and A is connected to this ring through B, Let the cost towards the root be "number of hops", i.e. apply equal metric for each link. Now suppose that node A has a failure event. In the vector-update-process, the node B notices mat the route to node A, which was distance I, is down e.g. because node B does not receive the vector update from node A. The problem is, node B also gets an update from node C, and node C is still not aware of the fact that node A is down so it tells node B that node A is reachable through D, which is false. The false information slowly propagates through the network towards infinity until it ages out.

The networks which implement the Rapid Spanning Tree Protocol (RSTP) which is a well known distance vector protocol may experience the count-to-infinity problem in certain failure scenarios. The same holds for the networks that implement the well known Multiple Spanning Tree Protocol (MSTP) which utilizes multiple RSTP instances so it has the same principles as RSTP and is considered as an extension of RSTP which means it may also experience the count-to-infinity problem in certain failure scenarios. In addition, the networks which have a Provider Backbone Bridge Network (PBBN) interfaced with an External Network to Network Interface (E-NNI) in accordance with the Layer Two Gateway Port (L2GP) protocol may also experience the count-to-infinity problem. These networks can experience the count-to-infinity problem because the L2GP protocol is an extension of MSTP. The PBBN, E-NNI, and the L2GP are described in detail in IEEE Sid. 802.1 ah, "IEEE Standard for Local and Metropolitan Area Networks: Virtual Bridged Local Area Networks—Amendment 6: Provider Backbone Bridges," 2008. The contents of this particular standard are incorporated herein by reference. FIG. 1 (PRIOR ART) is a diagram which illustrates the standard IEEE 801.1 bridge notation that is also used in this document.

As specified in IEEE 802.1 ah, each Layer Two Gateway Port (e.g., network interface port) is configured with a so called pseudoRootId, which is in fact a pseudo Bridge Identifier. The pseudoRootIDs are configured to be superior to any Bridge Identifier in the attached network domain. The Layer Two Gateway Ports then communicate their pseudoRootID in Bridge Protocol Data Units (BPDU) so the bridges in the domain of the attached PBBN interpret this pseudo information as real RSTP/MSTP information. In this manner, the Layer Two Gateway Ports emulate that they are connected to a bridge that is a potential candidate for being the root bridge of the spanning tree. The Layer Two Gateway Port which is configured with the superior pseudoRootID is the only one that remains active while all the other Layer Two Gateway Ports become blocked as the entire network considers that the root bridge is available through the one active Layer Two Gateway Port. If the connectivity is lost at the active link, then one of the formerly blocked links is activated. The order of precedence for the Layer Two Gateway ports is determined by their configured pseudoRootID. In this manner, the E-NNI is practically controlled by normal RSTP operation. An example of this type of system is provided and described below with respect to FIGS. 2A-2B (PRIOR ART).

Referring to FIG. 2A (PRIOR ART), there is a diagram illustrating an exemplary system 200 including a PBBN 202, an E-NNI 204, and a NMS 206 configured in accordance with IEEE 802.1 ah. The exemplary PBBN 202 has three bridges 208, 210, and 212 connected to one another plus the bridges 210 and 212 have network interface ports 2 and 4 (L2GPs 2 and 4) which are respectively connected to external bridges 214 and 216 within the E-NNI 204, Port 2 of bridge 210 and port 4 of bridge 212 are network interface ports (L2GPs) configured with different pseudoRootIDs 1 and 2 as specified in IEEE 802.1ah. The pseudoRootID 1 configured at port 2 of bridge 210 is "101", which is the best (superior) in this scenario, therefore network interface port 2 (L2GP 2) is an active port. The pseudoRootID 2 of port 4 of bridge 212 is "202", which is worse than (inferior to) port 2 thus port 4 (L2GP 4) is a blocked port. The NMS 206 is used to configure the pseudoRootIDs 1 and 2. At this point, there is no link failure between PBBN 202 and E-NNI 204 and the operation of L2GP is modeled in accordance with RSTP, thus different bridges 214 and 216 are needed to implement the different pseudoRootIDs 1 and 2.

Referring to FIG. 2B (PRIOR ART), there is a diagram illustrating how a link failure between the PBBN 202 and the E-NNI 204 results in the count-to-infinity problem. In this example, assume there is a link failure 218 between bridges 210 and 214 which causes the pseudoRootID 1 (i.e. "101") configured at the port 2 (L2GP 2) of the broken link to be circulated in the entire attached PBBN 202 until it ages out and a root path cost 220 to root bridge 214 is increased in each circulation from 10 to 100 (for instance), which is the count-to-infinity. In this example, the root path cost 220 reaches 100 before it ages out. In this situation, the worst case RSTP/MSTP convergence appears, furthermore, the backup interface port 4 in bridge 212 cannot take over as it is blocked till the end of the count-to-infinity. To make matters worse, the protection switching at the E-NNI 204 due to the link failure 218 results in a new root bridge election procedure of RSTP, and then the set-up of a new spanning tree, which is the worst case RSTP operation, especially if it results in count-to-infinity. Hence, the protection switching at the E-NNI 204 results in the worst case convergence for the attached PBBN 202, which should not be affected at all in art ideal ease. These shortcomings and other shortcomings are addressed by the present invention.

SUMMARY

A network management system, a method, and a system for avoiding a count-to-infinity problem are described in the independent claims of the present application. Advantageous embodiments of the network management system, the method, and the system are described in the dependent claims.

In one aspect, the present invention provides a method implemented by a network management system for avoiding a count-to-infinity problem in a network (e.g., PBBN) which has bridges with network interface ports (e.g., L2GPs) emulated to be connected to a pseudo root bridge in an external network (e.g., E-NNI). The method includes the steps of: (a) configuring the network interface ports to have a same pseudoRootID which is superior to all bridge identifiers associated with the bridges within the network; and (b) configuring the network interface ports to have different pseudoRootPathCosts. The pseudoRootID is an identification of the pseudo root bridge emulated to be within the external network. The pseudoRootPathCosts is a pseudo path cost set for each of the network interface ports relative to the pseudo root bridge. After the configuration, the network interface port having a smallest pseudoRootPathCost is set as forwarding to the external network and the other network interface ports are set as blocking to the external network. Thus, if a link between the external network and the network interface port having the smallest pseudoRootPathCost fails then the network interface port having the next smallest pseudoRootPathCost is activated. The advantage of using the pseudoRootPathCosts rather than the pseudoRootID is that the count-to-infinity problem can be avoided.

In yet another aspect, the present invention provides a network management system for avoiding a count-to-infinity problem in a network (e.g., PBBN) having bridges with network interface ports (e.g., L2GPs) emulated to be connected to a pseudo root bridge within an external, network (e.g., E-NNI). The network management system includes: (a) a processor; and (b) a memory that stores processor-executable instructions where the processor interfaces with the memory and executes the processor-executable instructions to perform the following operations: (i) configuring the network interface ports to have a same pseudoRootID which is superior to all bridge Identifiers associated with the bridges within the network; and (ii) configuring the network interface ports to have different pseudoRootPathCosts. The pseudoRootID is an identification of the pseudo root bridge emulated to be within the external network. The pseudoRootPathCosts is a pseudo path cost set for each of the network interface ports relative to the pseudo root bridge. After the configuration, the network interface port having a smallest pseudoRootPathCost is set as forwarding to the external network and the other network interface ports are set as blocking to the external network. Thus, if a link between the external network and the network interface port having the smallest pseudoRootPathCost fails then the network interface port having the next smallest pseudoRootPathCost is activated. The advantage of using the pseudoRootPathCosts rather than the pseudoRootID is that the count-to-infinity problem can be avoided.

In still yet another aspect, the present invention provides a system for avoiding a count-to-infinity problem. The system includes: (a) an external network (e.g., E-NNI) with an emulated pseudo root bridge; (b) a network (e.g., PBBN) with bridges having network interface ports (e.g., L2GPs) emulated to be connected to the pseudo root bridge; and (c) a network management system. The network management system includes: (a) a processor; and (b) a memory that stores processor-executable instructions where the processor interfaces with the memory and executes the processor-executable instructions to perform the following operations: (i) configuring the network interface ports to have a same pseudoRootID which is superior to all bridge identifiers associated with the bridges within the network; and (ii) configuring the network interface ports to have different pseudoRootPathCosts. The pseudoRootID is an identification of the pseudo root bridge within the external network. The pseudoRootPathCost is a pseudo path cost set for each of the network interface ports relative to the pseudo root bridge. After the configuration, the network interface port having a smallest pseudoRootPathCost is set as forwarding to the external network and the other network interface ports are set as blocking to the external network. Thus, if a link between the external network and the network interface port having the smallest pseudoRootPathCost fails then the network interface port having the next smallest pseudoRootPathCost is activated. The advantage of using the pseudoRootPathCosts rather than the pseudoRootID is that the count-to-infinity problem can be avoided.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

The present invention proposes to use a root path cost instead of the current standard root bridge identifier to configure pseudo information on Layer Two Gateway Ports. In particular, the present invention proposes to configure Layer Two Gateway Ports taking part in the same E-NNI to use the very same pseudoRootID but different pseudoRootPath-Costs. The Layer Two Gateway Port with the smallest pseudoRootPathCost will be set as forwarding and all other Layer Two Gateway Ports will be set as blocking according to RSTP operation. In effect, the present invention proposes to base the spanning tree operation of Layer Two Gateway Ports on pseudoRootPathCost information instead of the currently used pseudoRootID. A detailed discussion about an exemplary system, a network managements system, and a method which are configured in accordance with an embodiment of the present invention is provided below with respect to FIGS. 3-4.

Figure 3A:
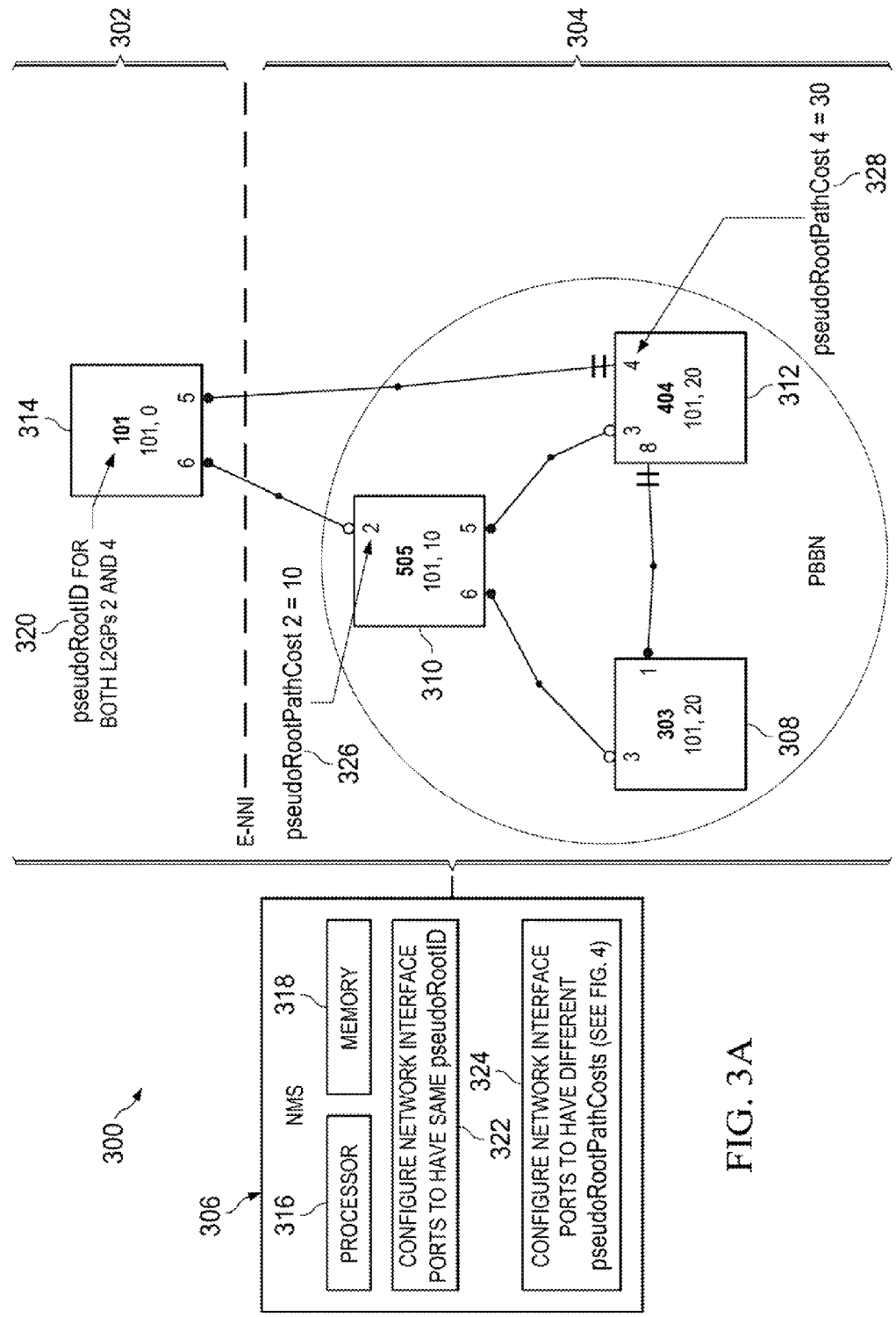
FIG. 3A is a diagram of an exemplary system including a PBBN, an E-NNI and a network management system configured in accordance with an embodiment of the present invention.
Figure 3B:
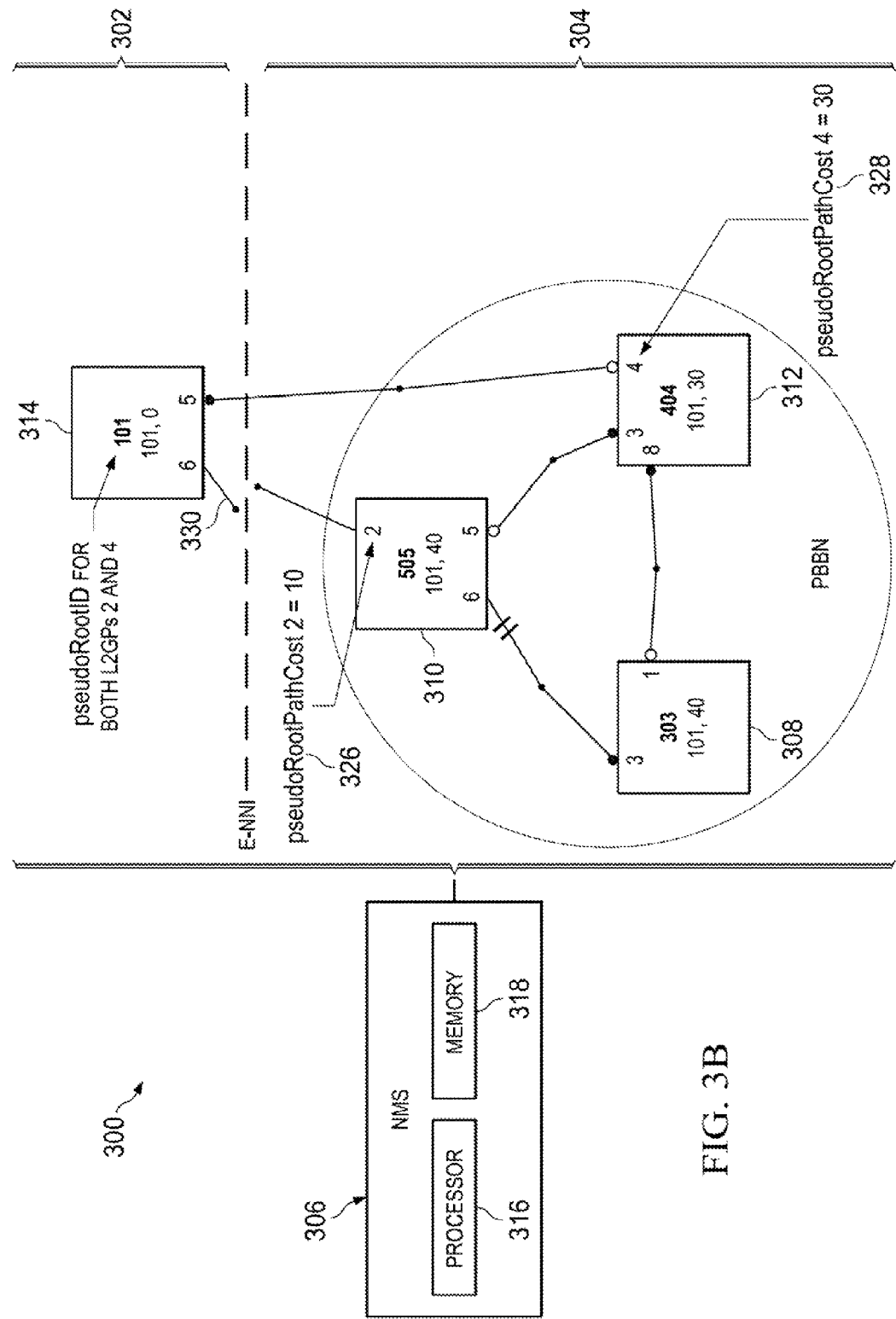
FIG. 3B is a diagram of the exemplary system shown in FIG. 3A which is used to explain how the count-to-infinity problem does not occur when there is a link failure between the PBBN and the E-NNI in accordance with an embodiment of the present invention.

Referring to FIGS. 3A-3B, there are diagrams illustrating an exemplary system 300 configured to avoid the count-to-infinity problem in accordance with an embodiment of the present invention. As shown in FIG. 3A, the exemplary system 300 includes an external network 302 (e.g., E-NNI 302), a network 304 (e.g., PBBN 304), and a NMS 306. In this example, the PBBN 304 has three bridges 308, 310, and 312 connected to one another plus the bridges 310 and 312 have network interface ports 2 and 4 (L2GPs 2 and 4) which are configured with the same pseudoRootID and emulated to be connected to a pseudo root bridge 314 (take root bridge 314) that is also emulated to be within the E-NNI 302, The E-NNI 302 and PBBN 304 can have many different configurations and many other components but for clarity only a basic configuration of bridges 308, 310, 312 and 314, and only the components relevant to the present invention have been described in herein.

As shown in FIG. 3A, the NMS 306 includes a processor 316 that is connected to a memory 318 which stores processor-executable instructions where the processor 316 interfaces with the memory 318 and executes the processor-executable instructions to perform the following operations: (1) configure the network interface ports 2 and 4 (L2GPs 2 and 4) to have a same pseudoRootID 320 (e.g., pseudoRootID "101") which is superior to all bridge identifiers (e.g., RootIDs "303", "404" and "505") associated with the bridges 308, 310, and 312 (see step 322); and (2) configure the network interface ports 2 and 4 (L2GPs 2 and 4) to have different pseudoRootPathCosts 326 and 328 (e.g., port 2's pseudo path cost=10, port 4's pseudo path cost=30)(see step 324)(see also FIG. 4), The pseudoRootID 320 is an identification of the pseudo root bridge 314. The pseudoRootPathCosts 326 and 328 is a path cost that is set for each of the network interface ports 2 and 4 relative to the pseudo root bridge 314.

In this example, the network interlace port 2 was intended to have precedence over network interface port 4 hence the network interface port 2's pseudo path cost was set to 10 while network interface port 4's pseudo path cast was set to 30. The network interface port 4's pseudo path cost was set to 30 because network interface port 2's path cost was 10 and the cost between bridges 310 and 312 was 10 which as discussed in more detail below means that port 4's pseudo path cost had to be larger than 20 and in this case 30 was chosen. After the configuration, the network interface port 2 having a smallest pseudoRootPathCost 326 is set as forwarding to the E-NNI 302 and the other network interface port 4 is set as blocking to the E-NNI 302.

Figure 1:
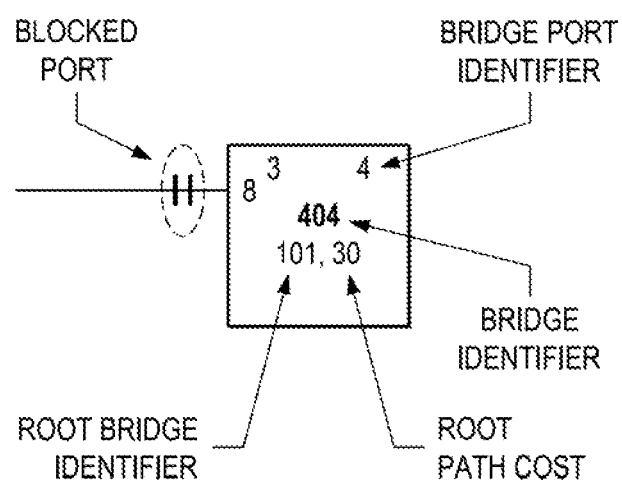
FIG. 1 (PRIOR ART) is a diagram which illustrates the standard IEEE 801.1 bridge notation that is used within this document.
Figure 2A:
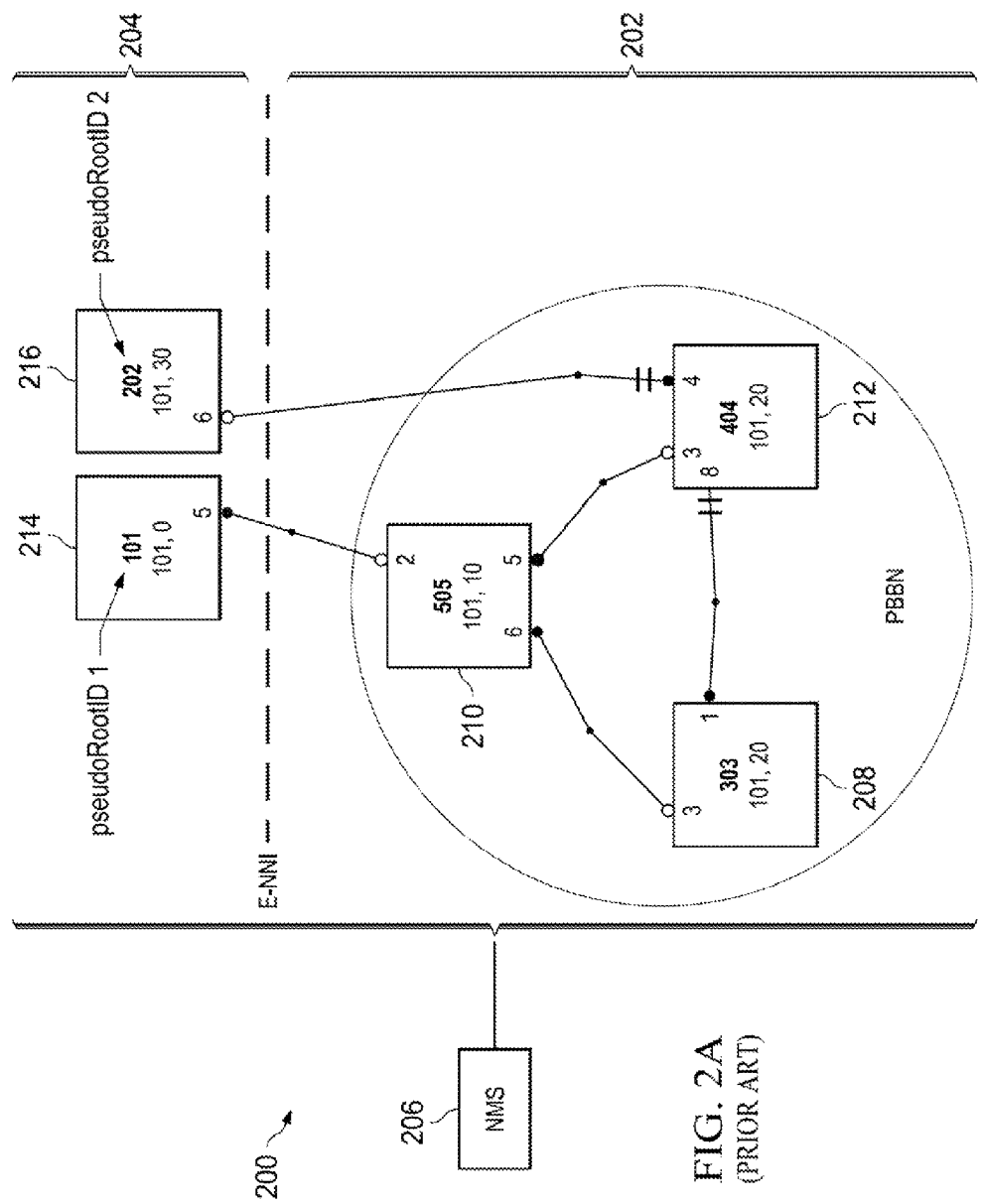
FIG. 2A (PRIOR ART) is a diagram of an exemplary system including a PBBN, an E-NNI and a network management system configured in accordance with the standard IEEE 801.1 ah.
Figure 2B:
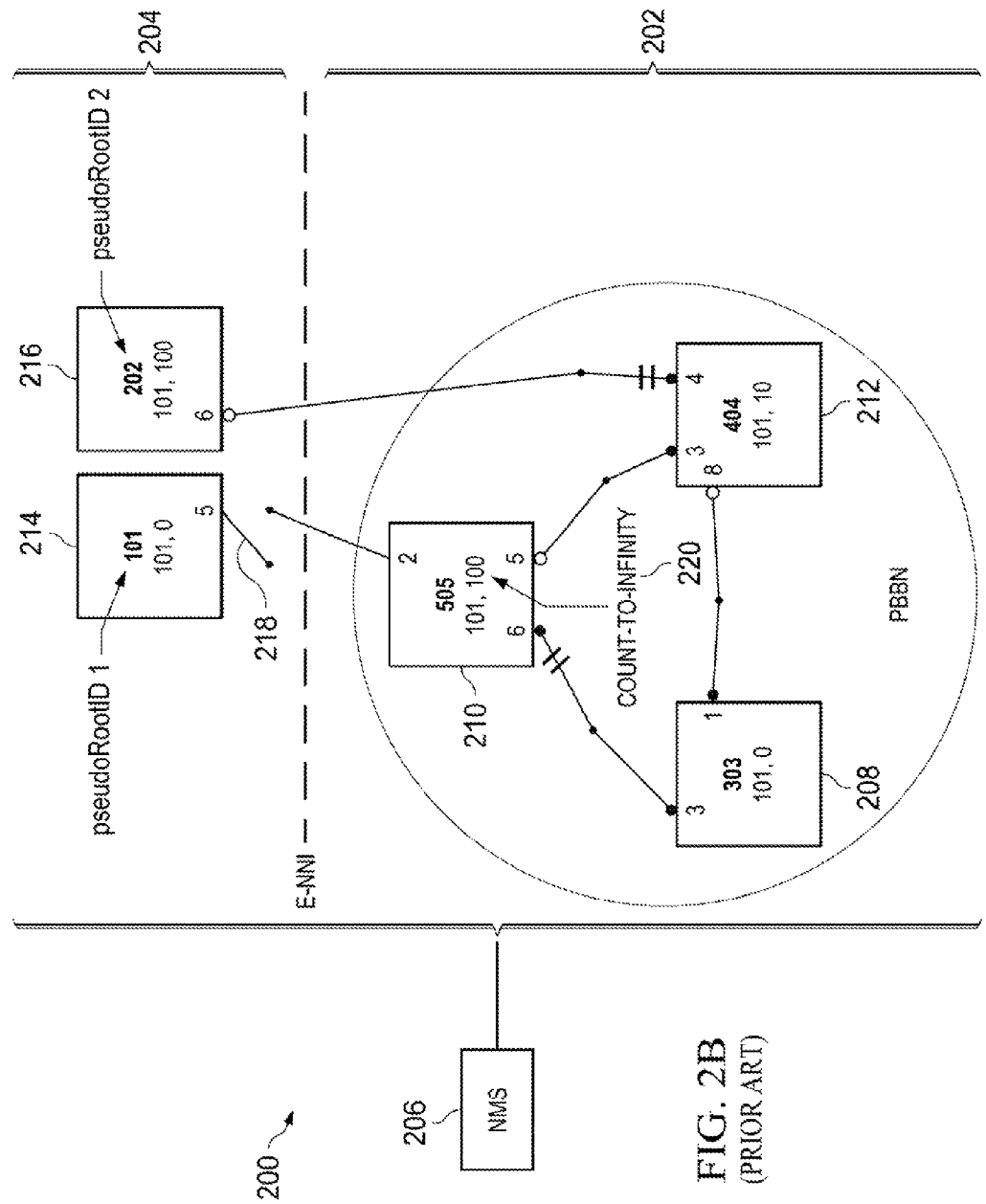
FIG. 2B (PRIOR ART) is a diagram of the exemplary system shown in FIG. 2A which is used to explain how the count-to-infinity problem can occur when there is a link failure between the PBBN and the E-NNI.

Thereafter, as shown in FIG. 3B, if an active link 330 between the E-NNI 302 and PBBN 304 associated with the network interface port 2 having the smallest pseudoRootPathCost 326 fails then as a consequence the spanning tree of PBBN 304 reconfigures itself such that the network interface port 4 having the next smallest pseudoRootPathCost 328 is activated. Plus, port 6 of bridge 310 becomes blocked instead of the formerly blocked port 8 of bridge 312. Thus Root Path Cost of bridge 312 becomes the pseudoRootPathCost configured by the NMS 306, which is 30 in FIG. 3B. The Root Path Cost for other bridges 308 and 310 are then incremental to the preconfigured pseudoRootPstCost by their distance to the bridge having the only active Layer Two Gateway Port, which is bridge 312 in FIG. 3B. The distance increment is 10 through each link in FIG. 3B, thus the Root Path Cost is 40 for bridges 308 and 310. Unlike, the failure scenario in the prior art shown in FIG. 2B where the count-to-infinity problem occurred, the present solution avoids the count-to-infinity problem. The present invention avoids the count-to-infinity problem because the scenarios wherein count to infinity may appear due to the operation of Layer Two Gateway Ports are avoided. A detailed discussion about some of the features of the present invention and some of the advantages associated with the present invention is provided next.

As discussed above, the network interface ports 2 and 4 (e.g., Layer Two Gateway Ports 2 and 4) participating with the same E-NNI 302 are configured with the same pseudoRootID 320 but with different pseudoRootPathCosts 326 and 328. The pseudoRootID 320 is configured to be superior to any Bridge Identifier of the attached PBBN 304. Therefore, each network interface port 2 and 4 'advertises' the same root bridge ID (pseudoRootID) into the PBBN 304, i.e. each network interface port 2 and 4 emulates that they are connected to the same root bridge 314. Therefore, the root bridge 314 of the spanning tree remains the same despite any change in the E-NNI 302. That is, root bridge re-election does not appear due to a switchover at the E-NNI 302 unless all of the connections are lost between the E-NNI 302 and PBBN 304. Thus, another advantage of the present invention is where the attached PBBN 304 is affected as least as possible by the L2GP operation.

Also discussed above, the pseudoRootPathCost 326 and 328 information determines which one of the E-NNI links between the E-NNI 302 and PBBN 304 is going to be active, where the intended precedence order of the network interface ports 2 and 4 (e.g., Layer Two Gateway Ports 2 and 4) is configured by setting proper values for the pseudoRootPathCosts 326 and 328. The physical topology of the PBBN 304 attached to the E-NNI 302 is typically redundant, i.e. it has at least a ring or even a more meshed topology. Hence, the smallest root path cost of the network internal path between the network interlace ports 2 and 4 (e.g., Layer Two Gateway Ports 2 and 4) should also be taken into account to properly configure the pseudoRootPathCosts 326 and 328. Thus, to set the values of the pseudoRootPathCosts 326 and 328, the value of the pseudoRootPathCost 328 at a lower precedence network interface port 4 has to be slightly greater than the pseudoRootPathCost 326 of the network interface port 2 which is higher in the order of precedence plus the smallest root path cost between the two network interface ports 2 and 4. An example of how the pseudoRootPathCosts 326 and 328 of multiple network interlace ports 2 and 4 (L2GPs 2 and 4) can be configured is discussed next with respect to FIG. 4.

Figure 4:
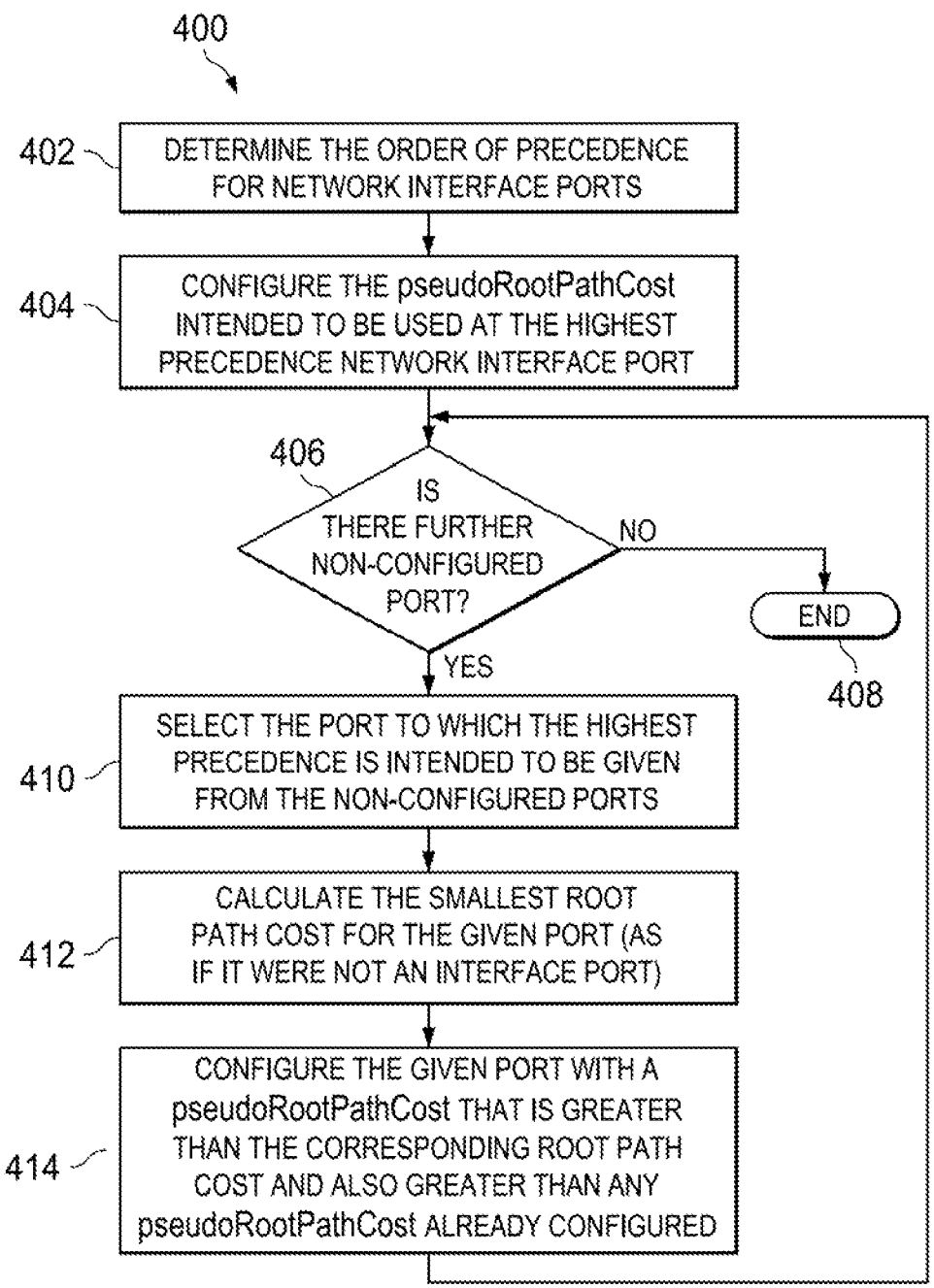
FIG. 4 is a flowchart of an exemplary method that can be implemented by the network management system shown in FIGS. 3A-3B to configure the pseudoRootPathCosts of the network interface ports (e.g., Layer Two Gateway Ports) between the PBBN and E-NNI in accordance with an embodiment of the present invention.

Referring to FIG. 4, there is a flowchart of an exemplary method 400 that can be implemented by the NMS 306 to configure the pseudoRootPathCosts 326 and 328 of the network interface ports 2 and 4 (only two in this example) between the E-NNI 302 and PBBN 304 in accordance with an embodiment of the present invention. As discussed above, the NMS 306 defines and configures the network interface ports (e.g., L2GPs 2 and 4) to have the same pseudoRootID 320 (e.g., pseudoRootID "101") which is superior to all bridge identifiers (e.g., RootIDs "303", "404" and "505") associated with the bridges 308, 310, and 312 (see FIG. 3's step 322).

The NMS 306 also configures the pseudoRootPathCosts of the network interface ports (e.g., L2GPs 2 and 4)(see FIG. 3's step 324).

As shown, the NMS 306 can configure the pseudoRootPathCosts by first determining at step 402 an order of precedence of the network interface ports (e.g, L2GPs 2 and 4). In this example, the L2GP 2 has a higher precedence than L2GP 4. As step 404, the NMS 306 configures the pseudoRootPathCost which is to be used for the highest precedence network interface port. In this example, the highest precedence L2GP 2 has a pseudoRootPathCost 326 set to 10. At step 406, the NMS 306 determines if any of the network interface ports have not yet been configured to have the pseudoRootPathCosts and if no then end at step 408. In this example, the NMS 306 has not yet configured the pseudoRootPathCost of L2GP 4, If the result of step 406 is yes, then the NMS 306 at step 410 selects the network interface port to which the highest precedence is to be given from the non-configured network interface ports. In this example, the NMS 306 selects the non-configured L2GP 4. The NMS 306 at step 412 calculates a smallest root path cost between the selected network interface port and the highest precedence network interface port. In this example, the smallest root path cost between L2GPs 2 and 4 is 10. Then, the NMS 306 at step 414 configures the selected network interlace port with the pseudoRootPathCost that is slightly greater than the smallest root path cost plus the highest pseudoRootPathCost of any of the previously configured higher precedence network interface ports. In this example, L2GP 4's pseudoRootPathCost cost was set to 30 because the smallest root path cost between L2GP 2 and 4 was 10 and L2GP 2's pseudoRootPathCost was 10 which means that L2GPport 4's pseudo path cost had to be larger than 20 and in this case 30 was chosen however 21, 22, 23 etc., would work as well but one should not select a number that is too large to really avoid the count-to-infinity problem. Thereafter, the NMS 306 returns to the determining step 406 and continues to configure the remaining network interface ports. As can be seen, the NMS 306 determines the pseudoRootPathCost values for each network interface port one by one according to their precedence order from the highest towards the lowest while the network internal path cost is taken into account as well.

From the foregoing, one skilled in the art will appreciate that the present invention proposes to use a root path cost instead of the current standard root bridge identifier to configure pseudo information on L2GPs. That is, the present invention proposes to configure L2GPs taking part in the same E-NNI to use the very same pseudoRootID but different pseudoRootPathCosts. The L2GP with the smallest pseudoRootPathCost will be set as forwarding and all other L2GPs will be set as blocking according to RSTP operation. In effect, the present invention proposes to base the spanning tree operation of L2GP on pseudo Root Path Cost information instead of the currently used pseudo Root ID. Thus, if this proposal is accepted by the standard committee, then the relevant specification in IEEE 802.1 ah would be updated accordingly. Furthermore, this proposal not only solves the count-to-infinity problem but also has an advantage in that protection switching at the E-NNI would no longer cause any significant convergence problem inside the domain of the attached PBBN. The convergence problem caused by count to infinity has always appeared in the past if the current standard Layer Two gateway Port operation is applied and the network was more complex than a chain of bridges.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the present invention that as has been set forth and defined within the following claims.

The invention claimed is:

1. A method implemented by a network management system for avoiding a count-to-infinity problem in a network, the network having bridges with network interface ports emulated to be connected to a pseudo-root-bridge in an external network, the method comprising:
   configuring the network interface ports to have a same pseudoRootID; that pseudoRootID being superior to all bridge identifiers associated with the bridges within the network; wherein the pseudoRootID is an identification of the pseudo-root-bridge emulated to be within the external network;
   configuring the network interface ports to have different pseudoRootPathCosts, wherein the pseudoRootPathCosts is a pseudo path cost set for each of the network interface ports relative to the pseudo-root-bridge; the network interface ports including a first network interface port having a smallest pseudoRootPathCost and a second network interface port having a next smallest pseudoRootPathCost;
   relative to the external network, both:
      setting the first network interface port as forwarding to the external network; and
      setting all other network interface ports as blocked to the external network;
   thereafter, in response to failure of a link between the external network and the first network interface port, setting the second network interface port as forwarding to the external network;
   wherein the configuring the network interface ports to have different pseudoRootPathCosts comprises:
      determining an order of precedence of the network interface ports;
      configuring a pseudoRootPathCost which is to be used for a network interface port with highest precedence;
      iteratively determining if any of the network interface ports have not yet been configured to have pseudoRootPathCosts, and if any of the network interface ports have not yet been configured to have pseudoRootPathCosts then:
         selecting a network interface port to which the highest precedence is to be given from the non-configured network interface ports;
         calculating a smallest root path cost between the selected network interface port and the highest precedence network interface port;
         configuring the selected network interface port to have a pseudoRootPathCost that is greater than a sum of the smallest root path cost and a highest pseudoRootPathCost of any of the previously configured higher precedence network interface ports.

2. The method of claim 1 further comprising enabling the network interface ports to advertise the pseudoRootID to the bridges in the network to emulate that the network interface ports are connected to the pseudo-root-bridge within the external network.

3. The method of claim 1 wherein:
   the network is a provider backbone bridge network;
   the external network is an external network to network interface; and
   the network interface ports are layer two gateway ports.

4. A network management system for avoiding a count-to-infinity problem in a network which has bridges with network interface ports emulated to be connected to a pseudo-root-bridge within an external network, the network management system comprising:
  a processor;
  a memory that stores processor-executable instructions and operatively connected to the processor;
  wherein the processor executes the processor-executable instructions to:
    configure the network interface ports to have a same pseudoRootID; that pseudoRootID being superior to all bridge identifiers associated with the bridges within the network; wherein the pseudoRootID is an identification of the pseudo-root-bridge emulated to be within the external network;
    configure the network interface ports to have different pseudoRootPathCosts, wherein the pseudoRootPathCosts is a pseudo path cost set for each of the network interface ports relative to the pseudo-root-bridge in the external network; the network interface ports including a first network interface port having a smallest pseudoRootPathCost and a second network interface port having a next smallest pseudoRootPathCost;
    setting the first network interface port as forwarding to the external network and all other network interface ports as blocking to the external network;
    thereafter, in response to failure of a link between the external network and the first network interface port, setting the second network interface port as forwarding to the external network;
  wherein the processor further executes the processor-executable instructions to configure the network interface ports to have different pseudoRootPathCosts by:
    determining an order of precedence of the network interface ports;
    configuring a pseudoRootPathCost which is to be used for a network interface port with highest precedence;
    iteratively determining if any of the network interface ports have not yet been configured to have pseudoRootPathCosts, and if any of the network interface ports have not yet been configured to have pseudoRootPathCosts then:
      selecting a network interface port to which the highest precedence is to be given from the non-configured network interface ports;
      calculating a smallest root path cost between the selected network interface port and the highest precedence network interface port;
      configuring the selected network interface port to have a pseudoRootPathCost that is greater than a sum of the smallest root path cost plus a highest pseudoRootPathCost of any of the previously configured higher precedence network interface ports.

5. The network management system of claim 4 wherein the processor further executes the processor-executable instructions to enable the network interface ports to advertise the pseudoRootID to the bridges in the network to emulate that the network interface ports are connected to the pseudo-root-bridge within the external network.

6. The network management system of claim 4 wherein:
  the network is a provider backbone bridge network;
  the external network is an external network to network interface; and
  the network interface ports are layer two gateway ports.

7. A system for avoiding a count-to-infinity problem, the system comprising:
  an external network with an emulated pseudo-root-bridge;
  a network with bridges having network interface ports emulated to be connected to the pseudo-root-bridge within the external network, including at least a first network interface port and a second network interface port;
  a network management system comprising:
    a processor;
    a memory that stores processor-executable instructions operatively connected to the processor;
    wherein the processor executes the processor-executable instructions to:
      configure the network interface ports to have a same pseudoRootID which is superior to all bridge identifiers associated with the bridges within the network, wherein the pseudoRootID is an identification of the pseudo-root-bridge emulated to be within the external network;
      configuring the network interface ports to have different pseudoRootPathCosts, wherein the pseudoRootPathCosts is a pseudo path cost set for each of the network interface ports relative to the pseudo-root-bridge emulated to be in the external network, wherein the first network interface port has a smallest pseudoRootPathCost and the second network interface port has a next smallest pseudoRootPathCost;
    wherein the first network interface port is set as forwarding to the external network and all other network interface ports are set as blocking to the external network;
    thereafter, in response to failure of a link between the external network and the first network interface port, setting the second network interface port as forwarding to the external network;
  wherein the processor further executes the processor-executable instructions to configure the network interface ports to have different pseudoRootPathCosts by:
    determining an order of precedence of the network interface ports;
    configuring a pseudoRootPathCost which is to be used for a network interface port with highest precedence;
    iteratively determining if any of the network interface ports have not yet been configured to have pseudoRootPathCosts, and if any of the network interface ports have not yet been configured to have pseudoRootPathCosts then:
      selecting a network interface port to which the highest precedence is to be given from the non-configured network interface ports;
      calculating a smallest root path cost between the selected network interface port and the highest precedence network interface port;
      configuring the selected network interface port to have a pseudoRootPathCost that is greater than a sum of the smallest root path cost plus a highest pseudoRootPathCost of any of the previously configured higher precedence network interface ports.

8. The system of claim 7 wherein the processor further executes the processor-executable instructions to enable the network interface ports to advertise the pseudoRootID to the bridges in the network to emulate that the network interface ports are connected to the pseudo-root-bridge within the external network.

9. The system of claim 7 wherein:
the network is a provider backbone bridge network;
the external network is an external network to network interface; and
the network interface ports are layer two gateway ports.

* * * * *